US012799871B2

(12) United States Patent
Cardinal-Pilote

(10) Patent No.: US 12,799,871 B2
(45) Date of Patent: Nov. 17, 2026

(54) VARIABLE INLET GUIDE VANE WITH ANGLED VANE INLET AND CONFORMING SHROUD PLUG

(71) Applicant: Pratt & Whitney Canada Corp., Longueuil (CA)

(72) Inventor: Henri Cardinal-Pilote, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/762,182

(22) Filed: Jul. 2, 2024

(65) Prior Publication Data

US 2026/0009338 A1 Jan. 8, 2026

(51) Int. Cl.

*F01D 9/04* (2006.01)
*F02C 7/04* (2006.01)
*F01D 11/00* (2006.01)
*F01D 17/16* (2006.01)

(52) U.S. Cl.

CPC .................. *F01D 9/04* (2013.01); *F02C 7/04* (2013.01); *F01D 11/005* (2013.01); *F01D 17/162* (2013.01); *F05D 2220/32* (2013.01); *F05D 2230/60* (2013.01); *F05D 2240/12* (2013.01); *F05D 2240/55* (2013.01)

(58) Field of Classification Search

CPC ........ F01D 17/162; F01D 9/04; F01D 11/005; F02C 7/04; F05D 2240/12; F05D 2240/55
See application file for complete search history.

(56) References Cited

U.S. PATENT DOCUMENTS 2,755,064 A * 7/1956 Simonsen ............... F01D 9/042 415/209.3
3,736,070 A * 5/1973 Moskowitz ........... F01D 17/162 415/147
5,308,226 A 5/1994 Venkatasubbu et al.
5,593,275 A 1/1997 Venkatasubbu et al.
(Continued)

FOREIGN PATENT DOCUMENTS

EP 2692995 B1 9/2017
FR 3109188 B1 8/2023
(Continued)

OTHER PUBLICATIONS

Extended European Search Report for EP Application No. 25187048.1, dated Dec. 4, 2025, pp. 1-6.

*Primary Examiner* — Courtney D Heinle
*Assistant Examiner* — Art Golik
(74) *Attorney, Agent, or Firm* — CANTOR COLBURN LLP

(57) ABSTRACT

An inlet guide vane assembly of a gas turbine engine, the assembly having an inlet case having an outer ring that extends axially along an engine axis between a ring front end and a ring aft end, and radially between a ring outer surface and a ring inner surface, wherein: the outer ring has a vane inlet, defined by a vane inlet surface that extends between the ring outer and inner surfaces; the vane inlet that is elliptically shaped having an inlet long axis disposed at an acute angle to the engine axis; and the assembly includes a shroud plug, the shroud plug having an inner portion that is disposed within the vane inlet, the inner portion having a shape that conforms with the vane inlet.

15 Claims, 15 Drawing Sheets

(56) References Cited

U.S. PATENT DOCUMENTS

| | | | | |
|---|---|---|---|---|
| 5,630,701 | A * | 5/1997 | Lawer | F01D 17/162 415/160 |
| 5,807,072 | A * | 9/1998 | Payling | F01D 17/162 277/422 |
| 6,413,043 | B1 * | 7/2002 | Bouyer | F01D 9/042 29/451 |
| 7,543,992 | B2 * | 6/2009 | Bruce | F16C 7/02 384/207 |
| 8,454,303 | B2 | 6/2013 | Garcia-Crespo | |
| 9,777,584 | B2 | 10/2017 | Cadieux | |
| 9,982,547 | B2 * | 5/2018 | Boeck | F04D 29/644 |
| 10,450,890 | B2 | 10/2019 | Menheere et al. | |
| 10,557,371 | B2 * | 2/2020 | Ruberte Sanchez | F01D 17/162 |
| 11,268,394 | B2 | 3/2022 | Frey et al. | |
| 2004/0052636 | A1 | 3/2004 | Schilling et al. | |
| 2006/0110246 | A1 * | 5/2006 | Bruce | F04D 29/563 415/160 |
| 2012/0082545 | A1 | 4/2012 | Peck et al. | |
| 2013/0251518 | A1 * | 9/2013 | Eleftheriou | F01D 17/162 29/888.025 |
| 2013/0340404 | A1 * | 12/2013 | Hughes | F02C 7/08 60/39.52 |
| 2014/0255177 | A1 * | 9/2014 | Cadieux | F01D 9/042 415/208.1 |
| 2016/0032760 | A1 * | 2/2016 | Boeck | F04D 29/161 415/126 |
| 2016/0298647 | A1 | 10/2016 | Hudson et al. | |
| 2019/0376409 | A1 | 12/2019 | Oda | |
| 2021/0285332 | A1 * | 9/2021 | Frey | F02C 7/28 |
| 2021/0363896 | A1 * | 11/2021 | Stoyanov | F01D 17/162 |
| 2025/0052169 | A1 | 2/2025 | Rauschmeier et al. | |

FOREIGN PATENT DOCUMENTS

| | | | | |
|---|---|---|---|---|
| GB | 599391 | A | 3/1948 | |
| WO | WO-2016059300 | A1 * | 4/2016 | F01D 17/162 |

* cited by examiner

VARIABLE INLET GUIDE VANE WITH ANGLED VANE INLET AND CONFORMING SHROUD PLUG

BACKGROUND

Exemplary embodiments pertain to variable inlet guide vanes and more specifically to a variable inlet guide vane with an angled vane inlet and a conforming shroud plug.

Gas turbine engines use variable inlet guide vanes (VIGV) to direct the flow coming onto the low-pressure compressor and the high-pressure compressor. During assembly, each vane is inserted through the vane inlet aperture from the outside of the gas path. These apertures are typically aligned with the engine centerline. A shroud plug is then inserted to close the gas path and hold the vane on its axis. As the vane inlet is long enough to allow the vane airfoil to pass, the structure that forms the vane inlet, i.e., the inlet case, is relatively long and heavy. Additionally, the interface between the vane inlet and the shroud plug may allow for air ingestion that creates undesirable non-uniform flow entering the gas path. The airflow issues are further complicated by flow through the interface between the inlet case and rotor shroud that surrounds the compressor.

BRIEF DESCRIPTION

Disclosed is an inlet guide vane assembly of a gas turbine engine, the assembly including an inlet case having an outer ring that extends axially along an engine axis between a ring front end and a ring aft end, and radially between a ring outer surface and a ring inner surface, wherein: the outer ring has a vane inlet, defined by a vane inlet surface that extends between the ring outer and inner surfaces; the vane inlet that is elliptically shaped having an inlet long axis disposed at an acute angle to the engine axis; and the assembly includes a shroud plug, the shroud plug having an inner portion that is disposed within the vane inlet, the vane inlet having a shape that conforms with the vane inlet.

In addition to one or more aspects of the assembly or as an alternate, the vane inlet defines a teardrop shape having a round end that is semicircular and a tapered end that is tapers to a rounded tip.

In addition to one or more aspects of the assembly or as an alternate, the shroud plug has a plug outer surface that defines a circumferentially extending plug groove that faces the vane inlet surface; and a packing gasket is disposed in the plug groove.

In addition to one or more aspects of the assembly or as an alternate, the ring outer surface of the outer ring defines a recessed platform that surrounds the vane inlet and defines platform perimeter shape; and the shroud plug has a plug outer portion defining a plug plate that is seated in the recessed platform and conforms to the shape of the recessed platform.

In addition to one or more aspects of the assembly or as an alternate, the platform perimeter shape is square; and the inner portion of the shroud plug is elliptically shaped having a plug long axis that extends diagonally across the plug plate of the shroud plug.

In addition to one or more aspects of the assembly or as an alternate, fastener apertures that are aligned with each other are respectively defined in the recessed platform of the outer ring and the plug plate of the shroud plug; and a fastener extends through the fastener apertures to fix the shroud plug to the outer ring.

In addition to one or more aspects of the assembly or as an alternate, the assembly includes a vane extending axially from an outer shaft end to an inner shaft end, wherein the outer shaft end defines a shroud disk and an outer shaft, and a bushing is disposed around the outer shaft end of the vane.

In addition to one or more aspects of the assembly or as an alternate, the shroud plug has a plug aperture, defined by a plug aperture surface, through which the outer shaft end of the vane and the bushing extends, whereby the plug aperture surrounds the bushing; and the plug aperture conforms to the shape of the bushing.

In addition to one or more aspects of the assembly or as an alternate, the outer shaft end of the vane defines a vane shaft groove that faces the bushing; and a packing gasket is disposed in the vane shaft groove.

Disclosed is a gas turbine engine, including a core having a hub shaft and a compressor extending axially along an engine axis from an inlet to an outlet; a rotor shroud surrounding the core at the compressor; an inlet case that is forward of the rotor shroud; an inlet guide vane assembly at the inlet of the compressor, the assembly including: an outer ring, of the inlet case, that extends axially along the engine axis between a ring front end and a ring aft end, and radially between a ring outer surface and a ring inner surface, wherein: the outer ring has a vane inlet, defined by a vane inlet surface that extends between the ring outer and inner surfaces; the vane inlet that is elliptically shaped having an inlet long axis disposed at an acute angle to the engine axis; and the assembly includes a shroud plug, the shroud plug having an inner portion that is disposed within the vane inlet, the vane inlet having a shape that conforms with the vane inlet.

In addition to one or more aspects of the engine or as an alternate, the vane inlet defines a teardrop shape having a round end that is semicircular and a tapered end that is tapers to a rounded tip.

In addition to one or more aspects of the engine or as an alternate, the shroud plug has a plug outer surface that defines a circumferentially extending plug groove that faces the vane inlet surface; and a packing gasket is disposed in the plug groove.

In addition to one or more aspects of the engine or as an alternate, the ring outer surface of the outer ring defines a recessed platform that surrounds the vane inlet and defines platform perimeter shape; and the shroud plug has a plug outer portion defining a plug plate that is seated in the recessed platform and conforms to the shape of the recessed platform.

In addition to one or more aspects of the engine or as an alternate, the platform perimeter shape is square; and the inner portion of the shroud plug is elliptically shaped having a plug long axis that extends diagonally across the plug plate of the shroud plug.

In addition to one or more aspects of the engine or as an alternate, fastener apertures that are aligned with each other are respectively defined in the recessed platform of the outer ring and the plug plate of the shroud plug; and a fastener extends through the fastener apertures to fix the shroud plug to the outer ring.

In addition to one or more aspects of the engine or as an alternate, the engine includes a vane extending axially from an outer shaft end to an inner shaft end, wherein the outer shaft end defines a shroud disk and an outer shaft, and a bushing is disposed around the outer shaft end of the vane.

In addition to one or more aspects of the engine or as an alternate, the shroud plug has a plug aperture, defined by a plug aperture surface, through which the outer shaft end of the vane and the bushing extends, whereby the plug aperture surrounds the bushing; and the plug aperture conforms to the shape of the bushing.

In addition to one or more aspects of the engine or as an alternate, the outer shaft end of the vane defines a vane shaft groove that faces the bushing; and a packing gasket is disposed in the vane shaft groove.

In addition to one or more aspects of the engine or as an alternate, the inlet case and the rotor shroud each have a mating flange, wherein a flange groove is formed in the mating flange of the inlet case that faces the mating flange of the rotor shroud; and a packing gasket is disposed in the flange groove.

Disclosed is a method of installing an inlet guide vane in a gas turbine engine, including inserting a vane, from an inner shaft end to an outer shaft end, through an elliptical shaped vane inlet that is oriented at an acute angle to an engine center axis, where a vane inlet is defined in an outer ring of an inlet case; positioning a hat-shaped bushing around the outer shaft end of the inlet guide vane so that a lip defined at an end of a bushing is against a shroud disk defined along the outer shaft end of the vane; positioning a shroud plug, which has a shape that conforms to the vane inlet, around the bushing so that a lip seat defined along a shroud plug aperture, intermediate opposite end surfaces of the shroud plug, is against the lip of the bushing, whereby an inner portion of the shroud plug is within the vane inlet, and a plug plate defined by the shroud plug is seated against a recessed platform defined in a ring outer surface of the outer ring; and inserting a fastener into aligned fastener apertures in the plug plate of the shroud plug and the recessed platform in the ring outer surface of the outer ring.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
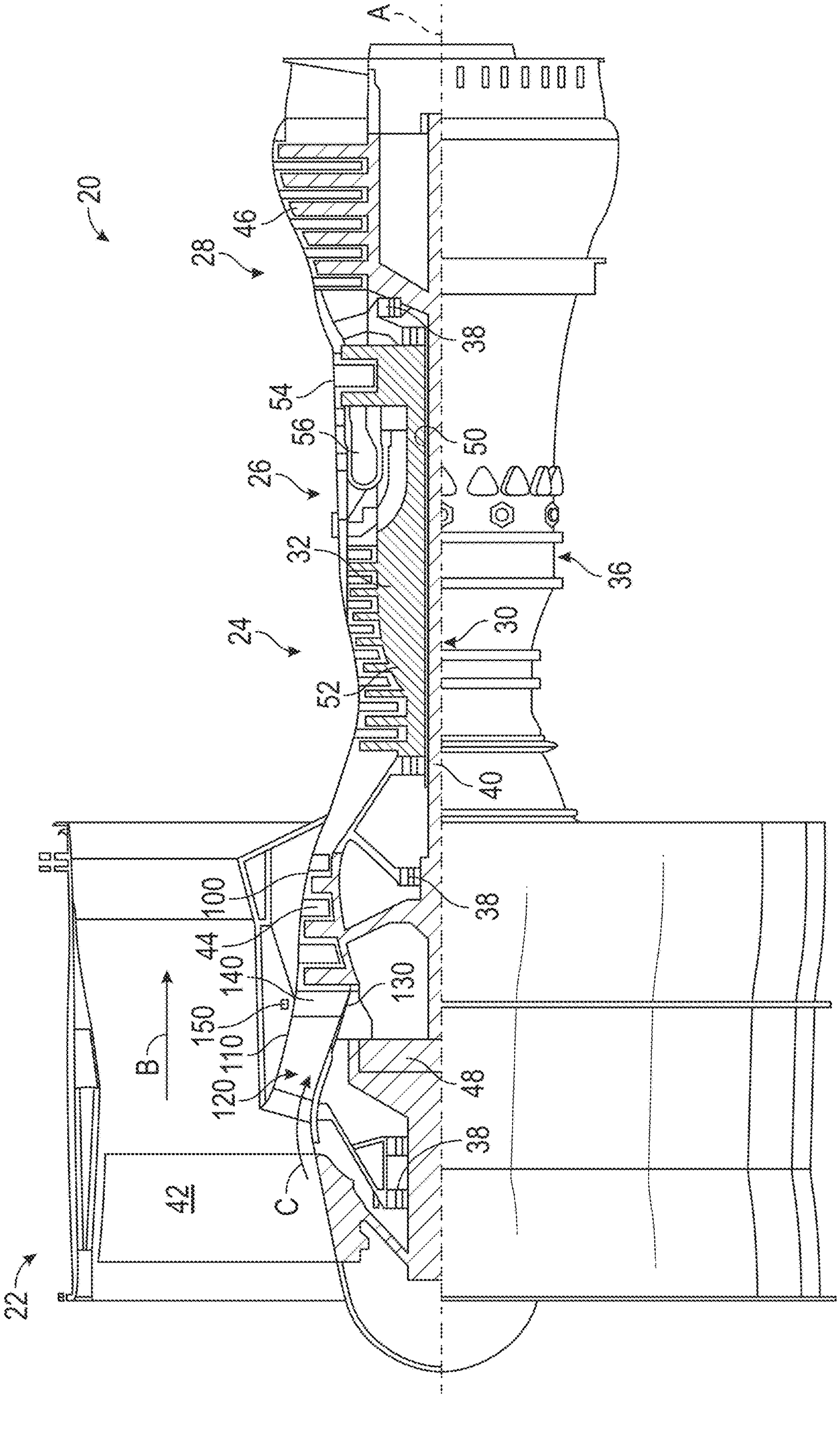
FIG. 1 is a partial cross-sectional view of a gas turbine engine, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A (engine radial axis R is also illustrated in FIG. 1) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

The engine 20, at the forward end, has a rotor shroud 100 surrounding the compressor 44 and an inlet case 110 forward of the rotor shroud 100. The inlet case 110 surrounds a variable inlet guide vane (VIGV) assembly 120 having a hub shaft 130. The assembly 120 includes a plurality of vanes 140, circumferentially distributed about the engine axis A. The vanes 140 are similarly configured and include a first vane that will be referred to, for simplicity, as a vane 140, which extends from the hub shaft 130 to the inlet case 110. An actuator 150 is operationally coupled to the vane 140 to control an orientation of the vane 140.

Figure 3:
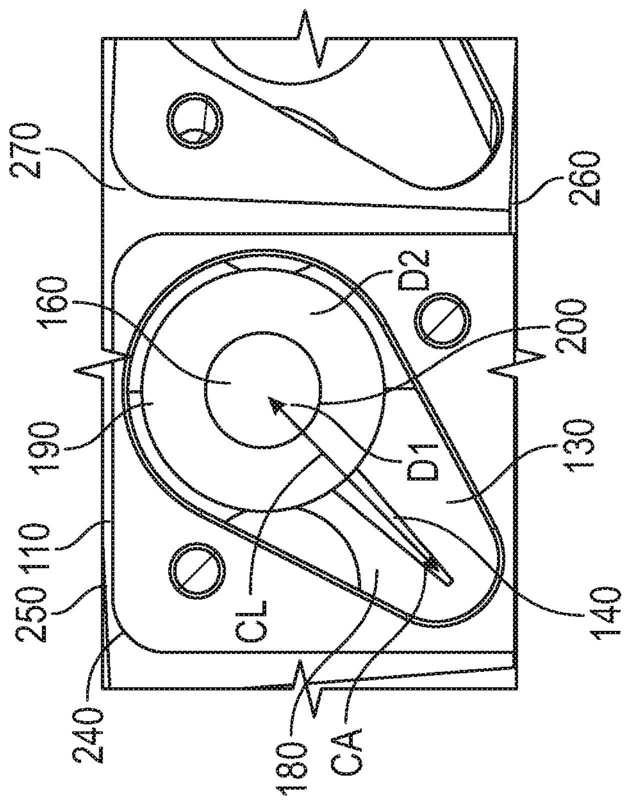
FIG. 3 is a top view of the variable inlet guide vane assembly shown in FIG. 2.
Figure 2:
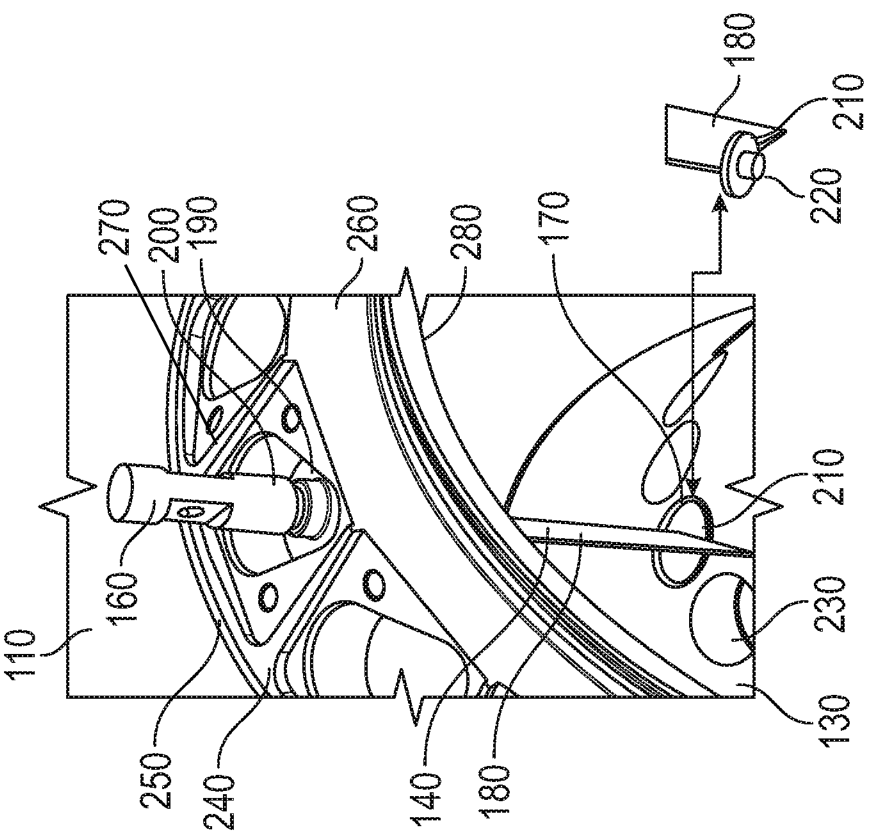
FIG. 2 is a perspective view of a variable inlet guide vane assembly according to an embodiment showing the vane inlet and the vane airfoil aligned with a long axis of the vane inlet.
Figure 4:
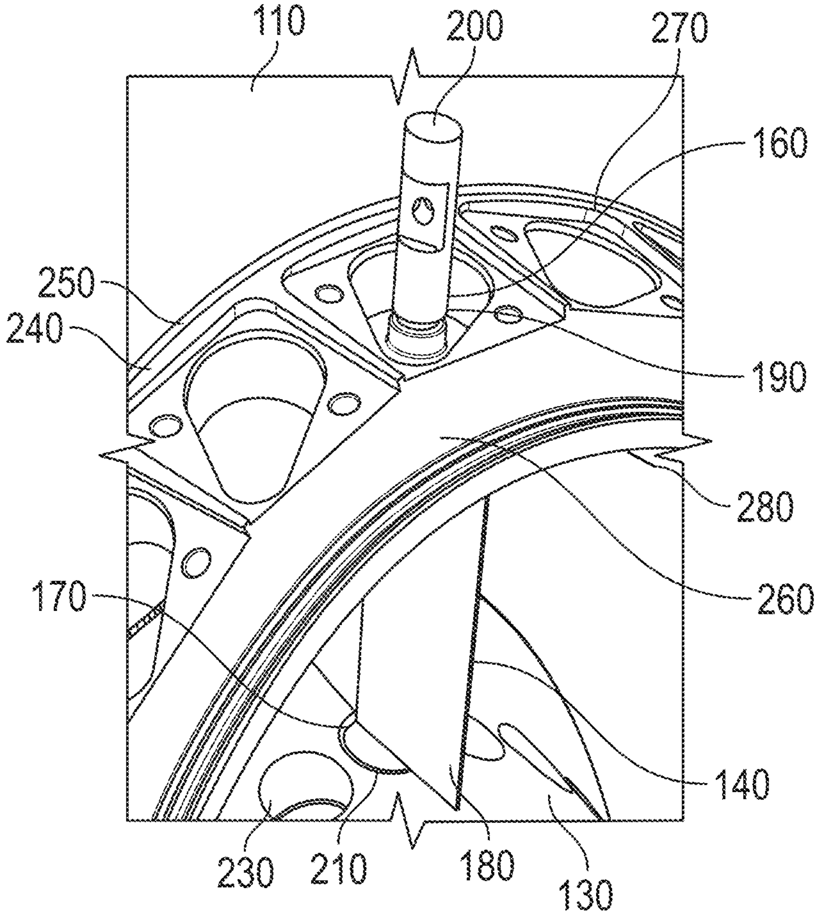
FIG. 4 is another perspective view of the variable inlet guide vane assembly showing the vane airfoil aligned with an engine center axis.

Turning to FIGS. 2-4, the vane 140 extends along the engine radial axis from an outer shaft end 160 to an inner shaft end 170. The vane 140 has an airfoil 180 having a chord length CL along a chord axis CA. The outer shaft end 160 of the vane 140 has a shroud disk 190 and an outer shaft 200. The inner shaft end 170 of the vane 140 has a hub disk 210 and an inner shaft 220. The outer shaft 200 has an outer shaft diameter (or first diameter) D1 and the shroud disk 190 has a shroud disk diameter (or second diameter) D2, which is larger than the outer shaft diameter D1.

The hub shaft 130 of the engine 20 defines a plurality of inner apertures 230 that are similarly configured and circumferentially distributed about the engine axis, one for each of the vanes 140. The inner apertures 230 include a first inner aperture for the first vane that, for simplicity, will be referred to as an inner aperture 230. The inner aperture 230 receives the hub disk 210 of the inner shaft end 170 of the vane 140.

The inlet case 110 defines an outer ring 240. The outer ring 240 extends axially along the engine axis between a ring front end 250 and a ring aft end 260. The outer ring 240 extends radially from a ring outer surface 270 to a ring inner surface 280.

Figure 6:
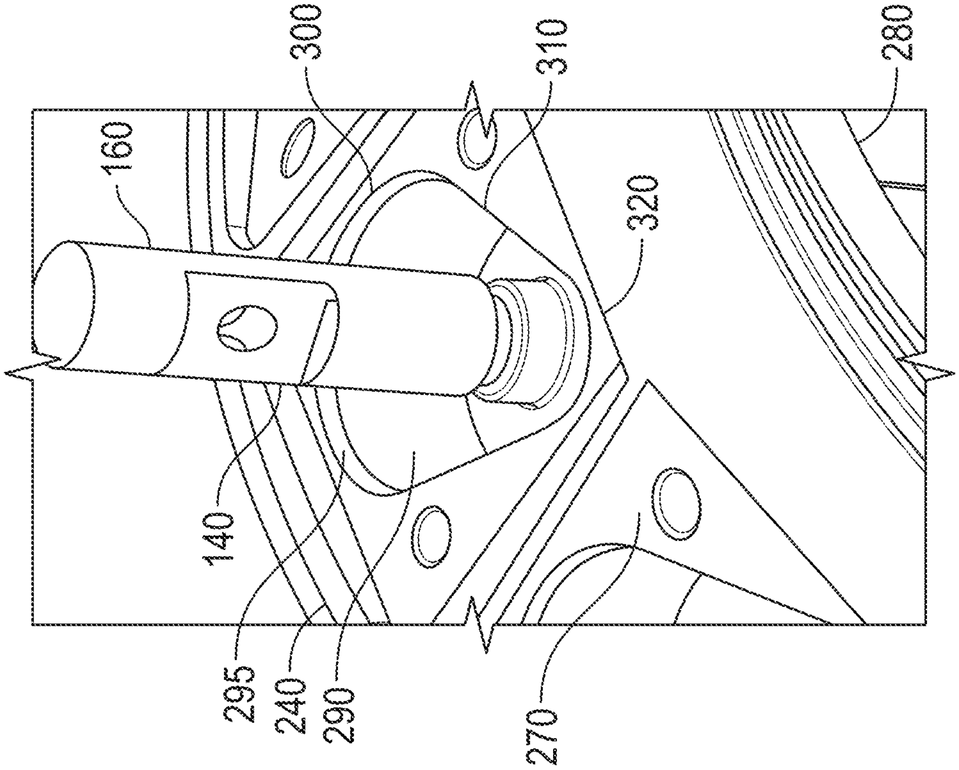
FIG. 6 is another perspective view of the assembly, showing details of the vane and vane inlet.
Figure 5:
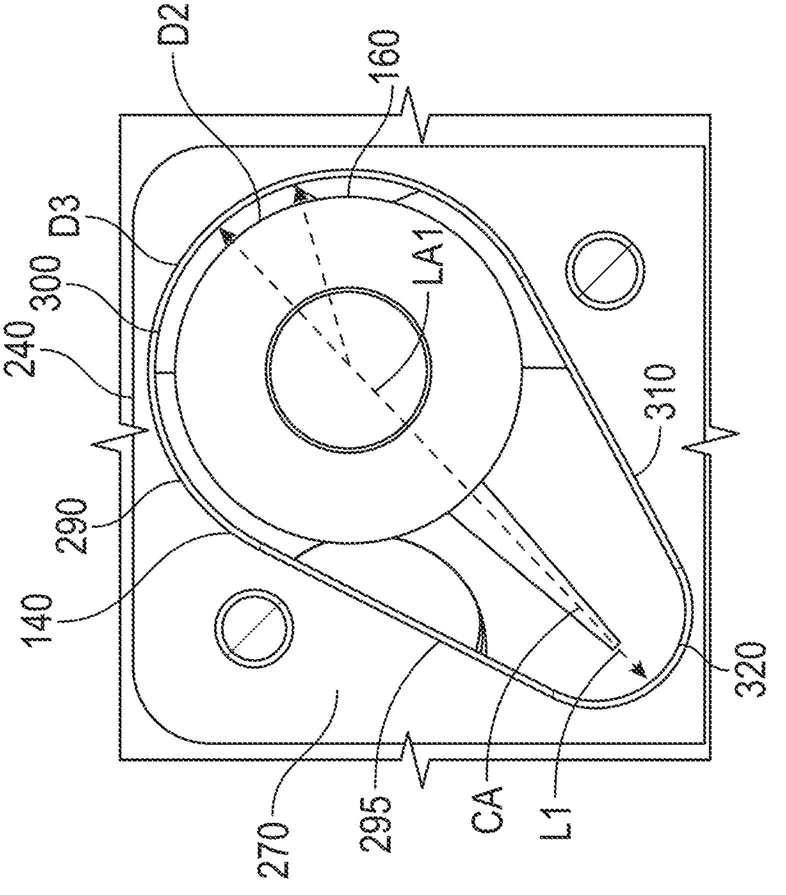
FIG. 5 is another top view of the assembly, showing details of the vane and vane inlet.
Figure 7:
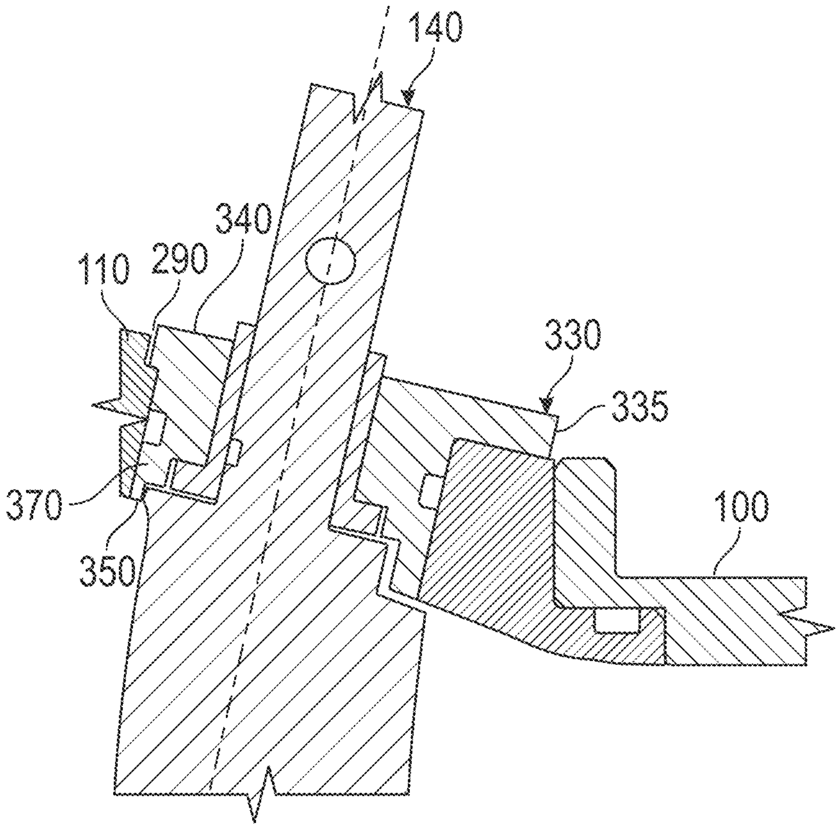
FIG. 7 is a cross-sectional view of the assembly showing the guide vane, a shroud plug, a bushing, the inlet case, the rotor shroud, and packing gaskets.
Figure 8:
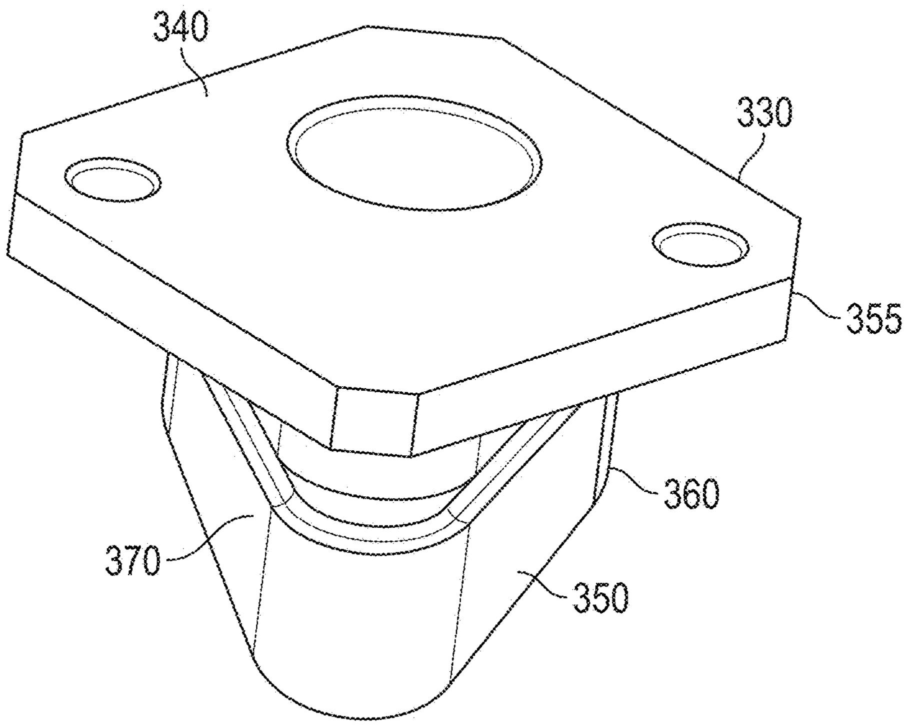
FIG. 8 shows a top perspective view of a shroud plug according to an embodiment.
Figure 9:
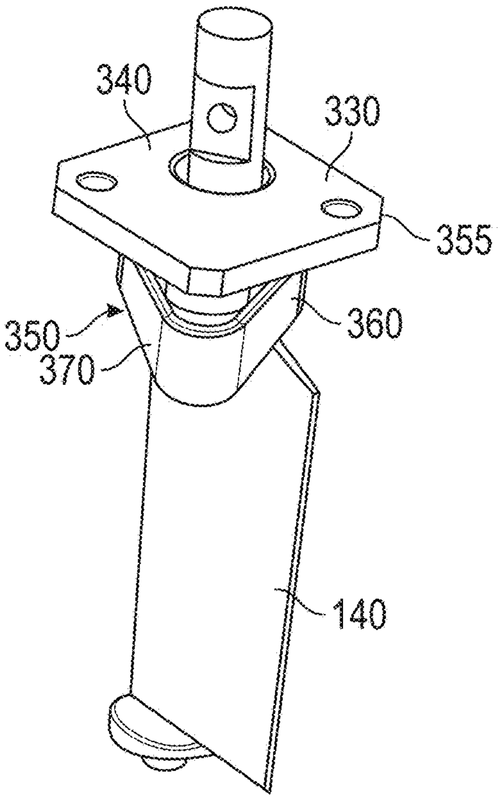
FIG. 9 shows the top perspective view of the shroud plug engaging the vane.
Figure 10:
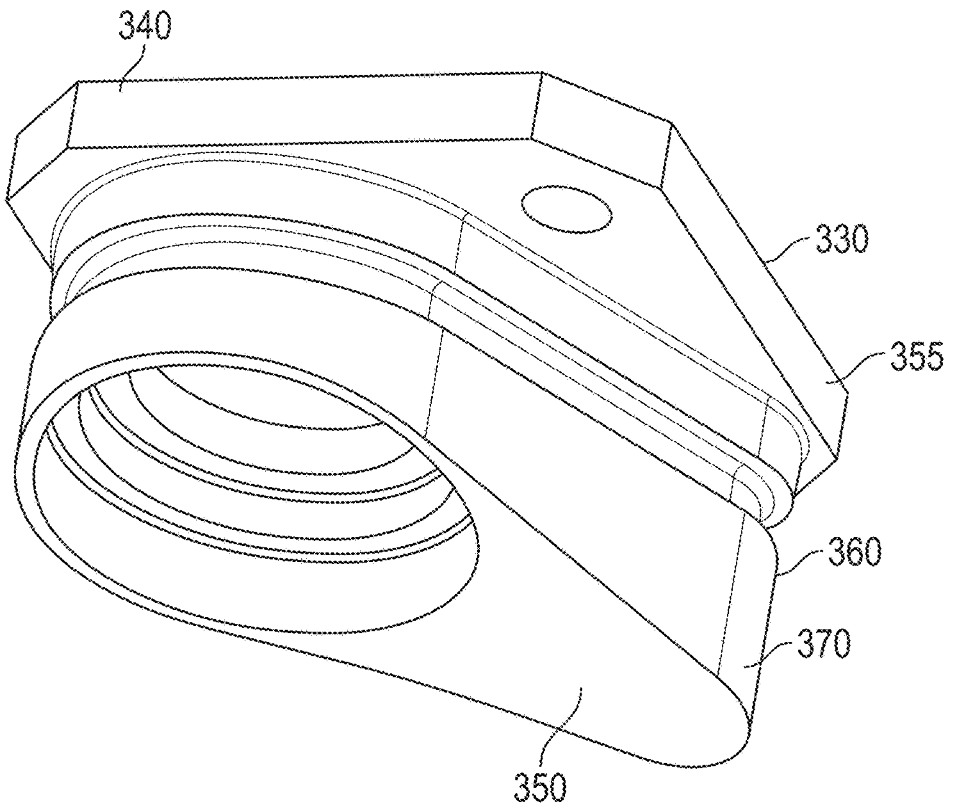
FIG. 10 shows a bottom perspective view of the shroud plug.
Figure 11:
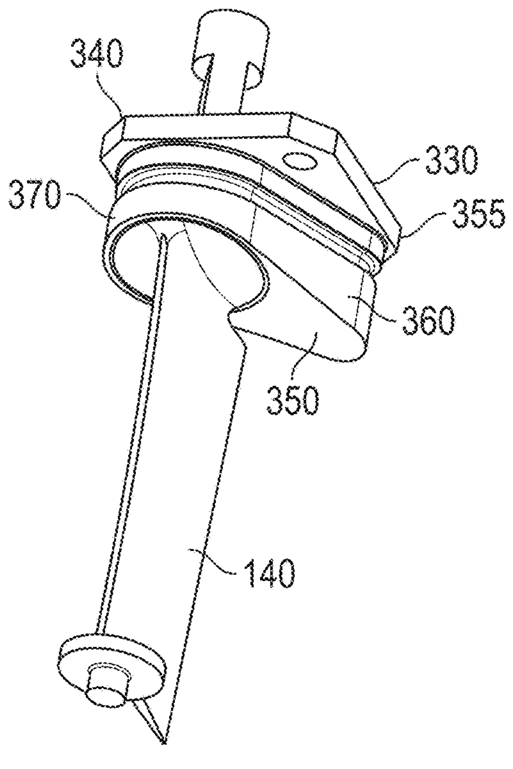
FIG. 11 shows the bottom perspective of the shroud plug engaging the vane.

Turning to FIGS. 5 and 6, the outer ring 240 defines a plurality of vane inlets (or ring apertures) 290, distributed about the engine axis A (FIG. 1), one for each of the vanes 140. The vane inlets 290 are similarly configured to each other and include a first vane inlet, which for simplicity, will be referred to as a vane inlet 290. The vane inlet 290 is a through-hole having a vane inlet surface 295 that extends between the ring outer and inner surfaces 270, 280. The vane 140 is inserted into the vane inlet 290 during installation, and the outer shaft end 160 of the vane 140 extends at least partially through the vane inlet 290 once the vane 140 is installed. That is, the outer shaft 200 of the vane 140 extends outwardly from vane inlet 290 and is engaged by the vane actuator 150 (FIG. 1).

The vane inlet 290 defines an elliptical shape with an inlet long axis LA1 disposed at an acute angle to the engine axis A. In one embodiment, the acute angle is forty-five degrees. The elliptical shape of the vane inlet 290 more specifically defines a teardrop shape or oval shape having a round end (or larger end) 300 that is semicircular, e.g., defining half of a circle, and a tapered end (or smaller end) 310 that tapers to a rounded tip 320, which may also be semicircular. The outer shaft end 160 of the vane 140 is centered in the round end 300 of the vane inlet 290.

The vane inlet 290, along the inlet long axis LA1, has an aperture length L1 that is larger than the chord length CL. The round end 300 of the vane inlet 290 has an inlet diameter (or third diameter) D3 that is larger than the shroud disk diameter D2. With this configuration, the vane 140 may be installed through the vane inlet 290 during installation by orienting the airfoil 180 so that the chord axis CA is along the inlet long axis LA (FIGS. 2, 3 and 5). Thereafter the airfoil 180 may be turned so that the chord axis CA is parallel to the engine axis A (FIG. 4) and then the vane 140 may be attached to the actuator 150.

Turning to FIGS. 7-11 a plurality of shroud plugs 330 are provided, one for each of the vanes 140. The shroud plugs 330 are similarly configured and include a first shroud plug, that will be referred to, for simplicity, as a shroud plug 330. The shroud plug 330 surrounds the portion of the outer shaft end 160 of the vane 140 that is within the vane inlet 290.

The shroud plug 330 may extend along the engine radial axis between plug outer and inner surfaces 340, 350. Between the outer and inner surfaces 350, the shroud plug 330 has a plug outer portion 355 and a plug inner portion 360. The plug outer portion 355 is a plug plate 357 (FIG. 16) that will be discussed in greater detail below. The plug inner portion 360 fits within the vane inlet 290 and has a plug outer surface 370 that is circumferentially extending about the shroud plug 330 and defines an outer shroud plug shape that conforms to the vane inlet shape.

Figure 12:
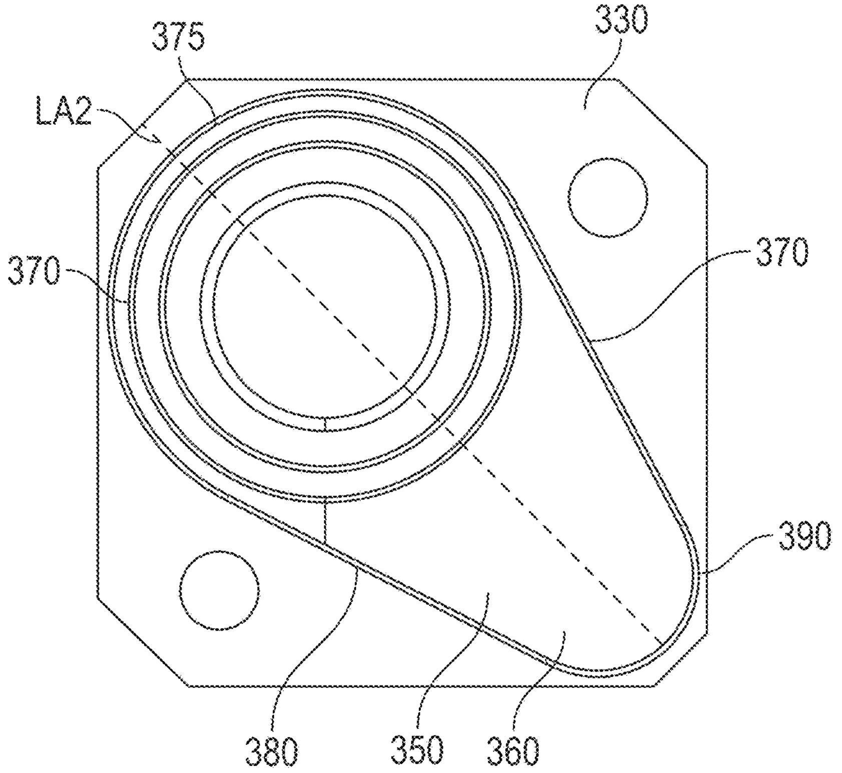
FIG. 12 shows a bottom view of the shroud plug.
Figure 13:
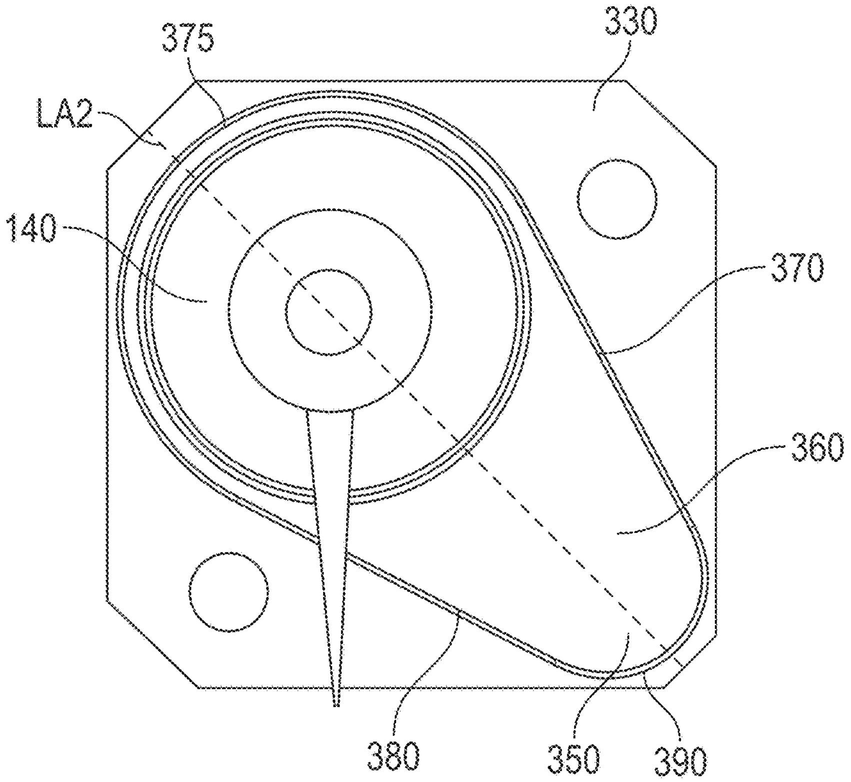
FIG. 13 shows the bottom view of the shroud plug engaging the vane.

That is, as shown in FIGS. 12 and 13, the plug inner portion 360 of the plug 330 has an elliptical shape that more specifically defines a teardrop shape or oval shape. The shroud plug 330 has a plug round end (or larger end) 375 that is semicircular with a plug diameter (or fourth diameter) D4 that is smaller than the inlet diameter D3, and larger than the shroud disk diameter D2. Adjacent to the plug round end 375 on a plug long axis LA2, the shroud plug 330 has a plug tapered end (or smaller end) 380 and has a rounded tip 390.

Figure 14:
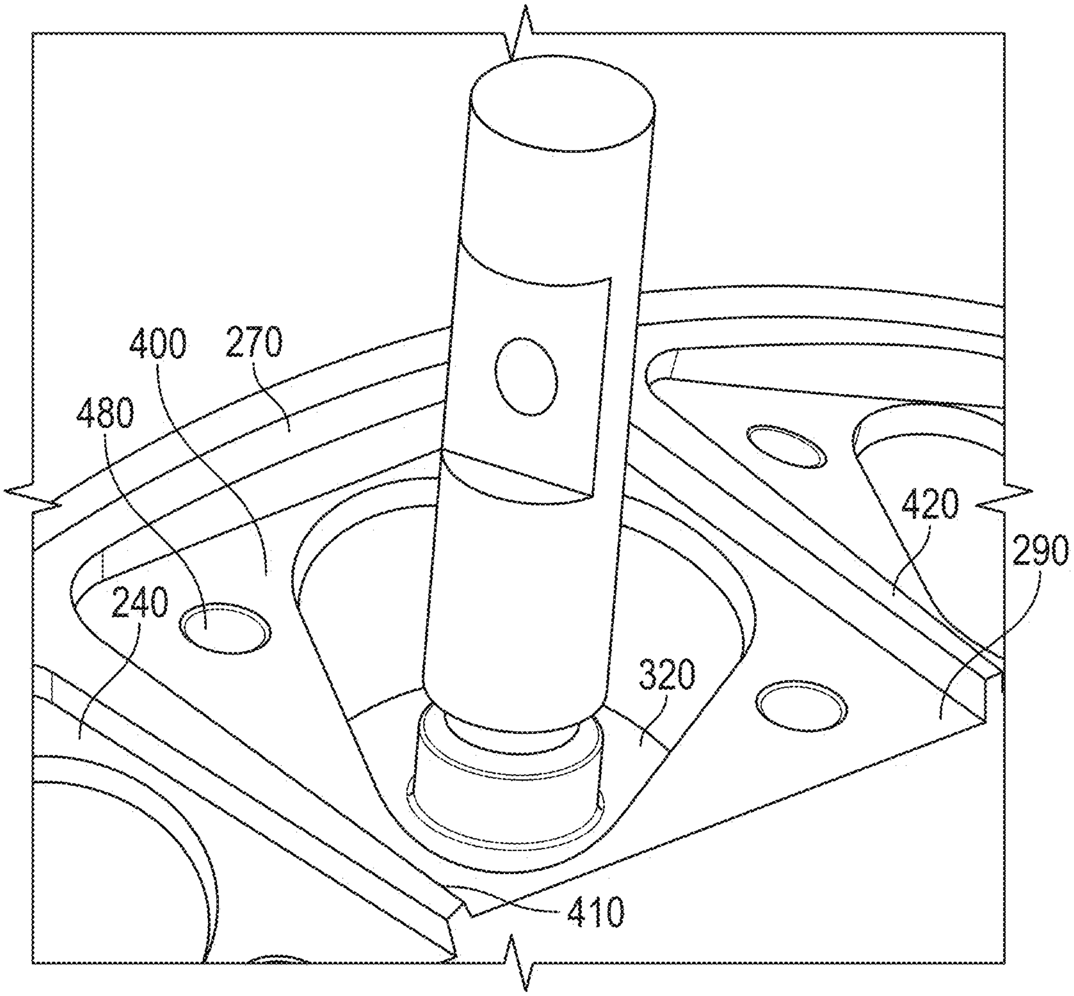
FIG. 14 shows details of a ring recessed platform defined in the ring.
Figure 15:
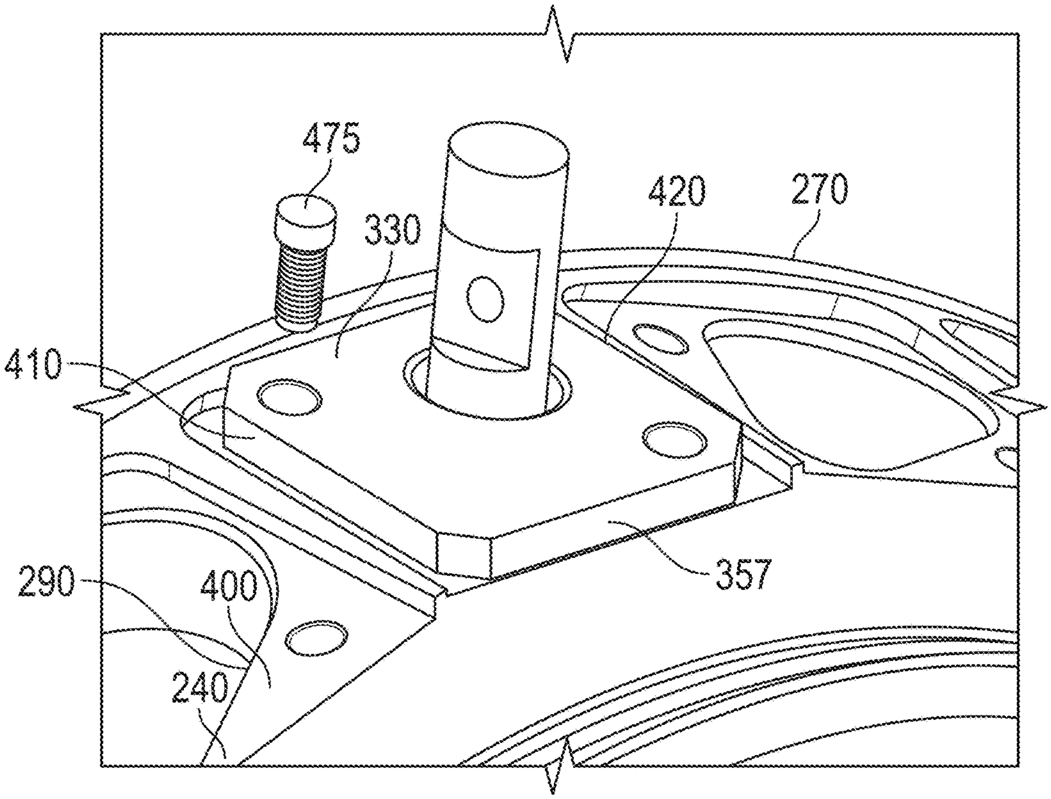
FIG. 15 shows details of a plug plate of the shroud plug that is received in the ring recessed platform for mounting the shroud plug to the outer ring of the assembly.
Figure 16:
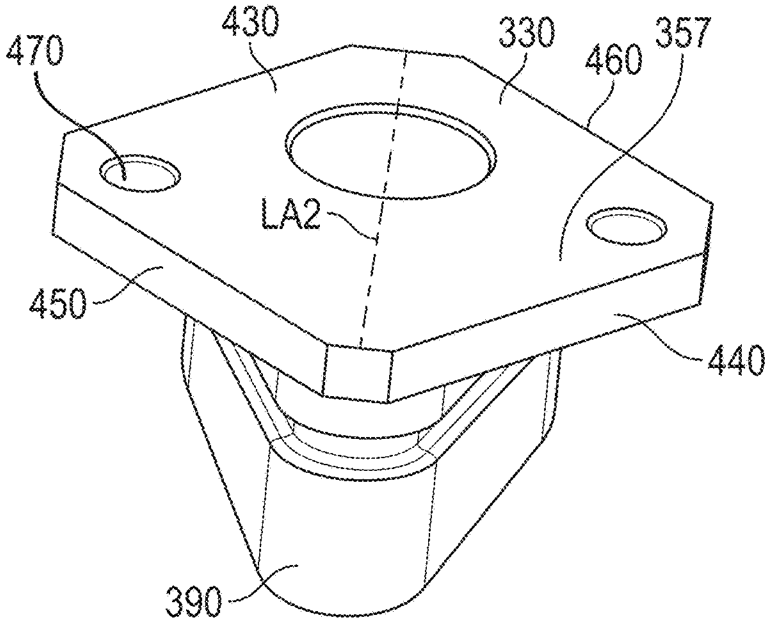
FIG. 16 shows additional details of the plug, and identifies the plug plate for mounting the shroud plug to the outer ring of the assembly.

Turning to FIGS. 14-16, the outer surface 270 of the outer ring 240 defines ring recessed platforms 400 respectively surrounding the vane inlets 290. The ring recessed platforms 400 are configured the same and include a first ring recessed platform which, for simplicity, will be referred to as a ring recessed platform 400. The ring recessed platform 400 defines platform perimeter shape. In one embodiment, the platform perimeter shape is square, e.g., with circumferentially opposite side edges 410, 420 that extend parallel to the engine axis.

As indicated, the outer portion 355 of shroud plug 330 is a plug plate 357 that is seated in the ring recessed platform 400. The plug plate 357 defines a plate perimeter that conforms to the shape of the perimeter of the ring recessed platform 400. As such, the plate platform 357 has forward and aft edges 430, 440 and circumferential opposite edges 450, 460, and the long plug axis LA2 extends diagonally across the plug plate 357. As shown in the figures, the rounded tips 320, 390 of the vane inlet 290 and the shroud plug 330 are located aft of the rounded ends 300, 375 of the vane inlet 290 and the shroud plug 330.

The long plug axis LA1 of each vane inlet 290 is parallel to the long plug axis LA1 of each other vane inlet 290. Due to the configuration of the vane inlets 290, the long plug axis LA2 of each shroud plug 330 is parallel to the long plug axis LA2 of each other shroud plug 330 when installed.

Fastener apertures 470, 480 that are aligned with each other are defined in the ring recessed platform 400 and the plug plate 357. A fastener 475 extends through the fastener apertures 470, 480 to fix the shroud plug 330 to the outer ring 240.

Figure 17:
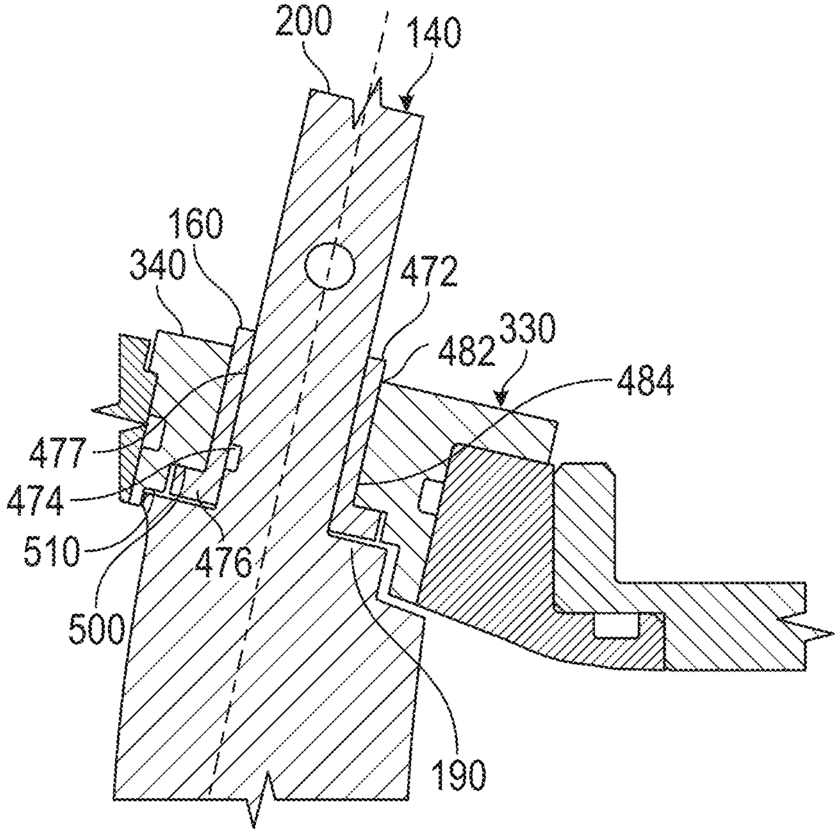
FIG. 17 is the cross-sectional view of the assembly, identifying details of a bushing that surrounds an upper end of the vane and details of a shroud plug aperture through which the upper end of the vane, and the bushing, extend.
Figure 18:
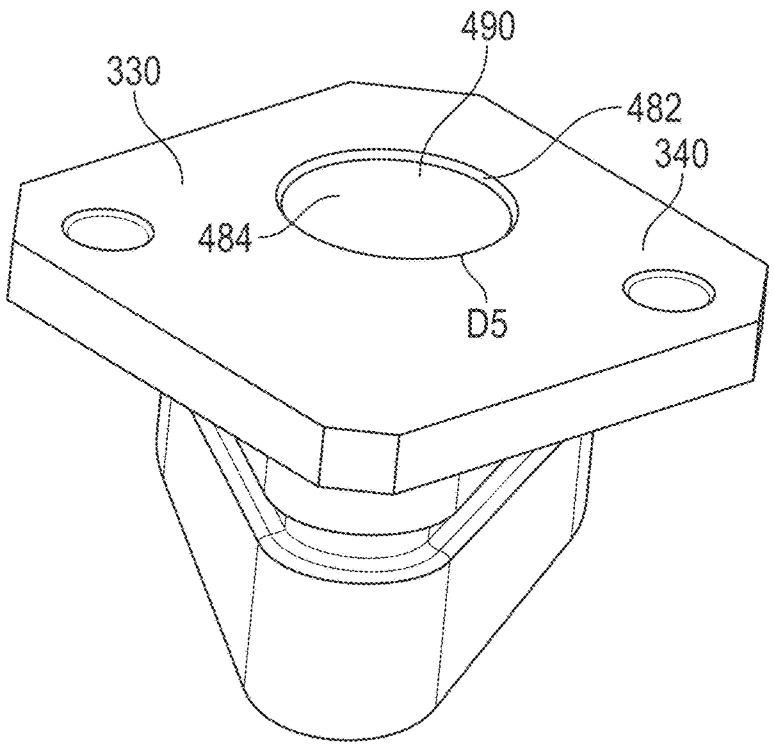
FIG. 18 shows the top perspective view of the shroud plug, and identifies details of the shroud plug aperture.
Figure 19:
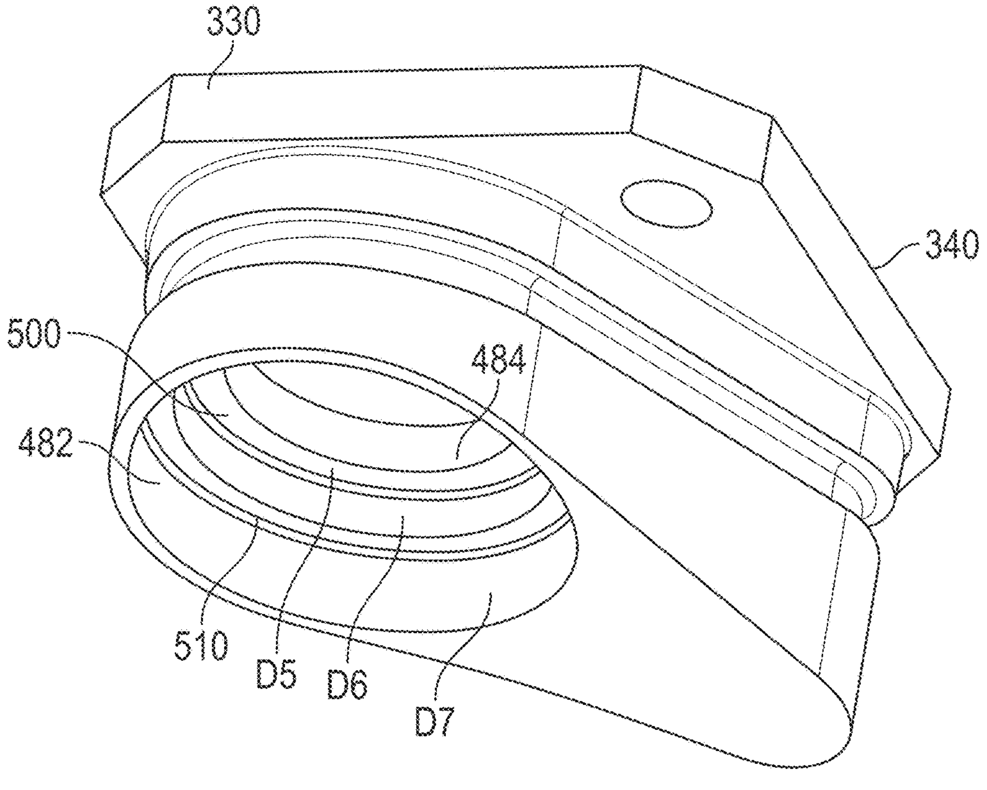
FIG. 19 shows the bottom perspective view of the shroud plug, and identifies details of the shroud plug aperture.
Figure 20:
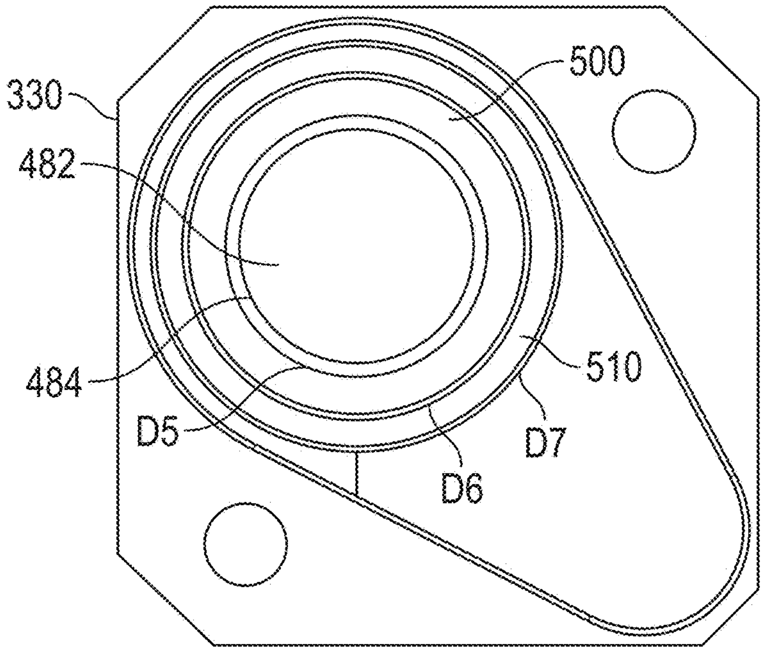
FIG. 20 shows the bottom view of the shroud plug, and identifies details of the shroud plug aperture.

Turning to FIG. 17, a hat-shaped bushing 472 surrounds the vane outer end 160. The bushing 472 defines a bushing shaft 474 and a bushing lip 476 at an inner end 477 of the bushing shaft 474. The bushing 472 is oriented so that the bushing lip 476 is against the shroud disk 190 and the bushing shaft 474 extends along the vane outer shaft 200, to the outer surface 340 of the shroud plug 330.

With reference to FIG. 17-20, the shroud plug 330 has an axially extending plug aperture 482 defined by a plug aperture surface 484. The plug aperture 482 is a through-hole and has a shape that conforms with the bushing 472. The plug aperture 482 also conforms with portions of the vane outer shaft end 160, including the shroud disk 190 of the vane 140, that are within the aperture 482 and not surrounded by the bushing 472.

The plug aperture 482 has an outer end 490 with a plug aperture outer diameter (or fifth diameter) D5 that is against the bushing shaft 474. The plug aperture 482 has an intermediate portion 492 with a plug aperture intermediate diameter (or sixth diameter) D6 that is larger than the plug aperture outer diameter D5. The transition between the outer and intermediate diameters D5, D6 of the plug aperture 482 is a first stepped surface 500 that is against the bushing lip 476, thereby forming a lip seat from the first stepped surface 500. The plug aperture 482 has an inner end 495 with a plug aperture inner diameter (or seventh diameter) D7 that is larger than the plug aperture intermediate diameter (or sixth diameter) D6. The transition between the intermediate and inner diameters D6, D7 of the plug aperture 482 is a second stepped surface 510 that is against the shroud disk 190, thereby forming a shroud disk seat from the second stepped surface 510. As can be appreciated, both stepped surfaces 500, 510 are intermediate the outer and inner surfaces 270, 280 of the outer ring 240.

Figure 21:
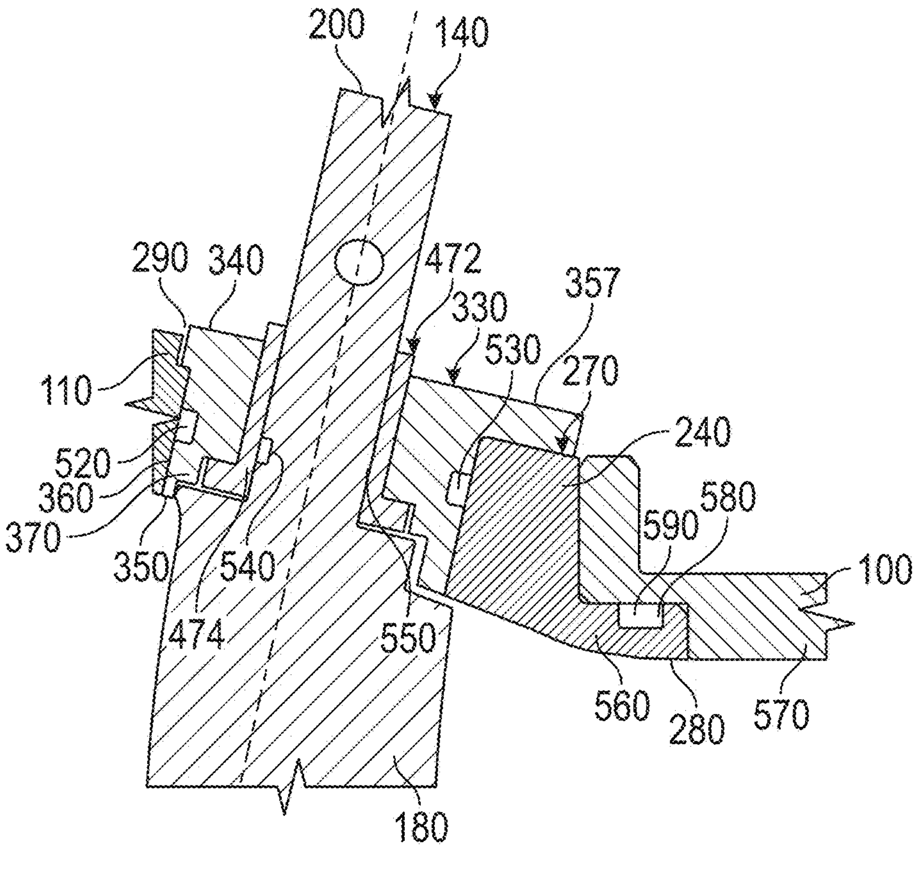
FIG. 21 is the cross-sectional view of the assembly, identifying details of gaskets between the bushing, shroud plug, inlet case and rotor shroud.

Turning to FIG. 21, the inner surface 350 of the shroud plug 330 may be planar, surround the shroud disk 190, extend to the airfoil 180 and smoothly transition to the surrounding inner surface 280 of the outer ring 240 of the inlet case 110. The outer surface 340 of the shroud plug 330, which defines the plug plate 357, may also be planar such that it is parallel with the outer surface 270 of the outer ring 240. However, it can be appreciated that the outer and inner surfaces 270, 280 of the outer ring 240 may be disposed at an acute angle to each other. As such, the outer and inner surfaces 340, 350 of the shroud plug 330 may be disposed at an acute angle to each other that matches the acute angle of the outer and inner surfaces 270, 280 of the outer ring 240.

With continued reference to FIG. 21, a plug groove 520 is defined in the plug outer surface 370 that extends, e.g., circumferentially around the plug inner portion 360 and faces the vane inlet 290. A plug packing gasket (or first gasket) 530 that is ring shaped is disposed in the plug groove 520. The vane outer shaft 200 defines a vane shaft groove 540, which faces the bushing shaft 474. A bushing packing gasket (or second gasket) 550 that is ring shaped is disposed in the vane shaft groove 540.

Figure 22:
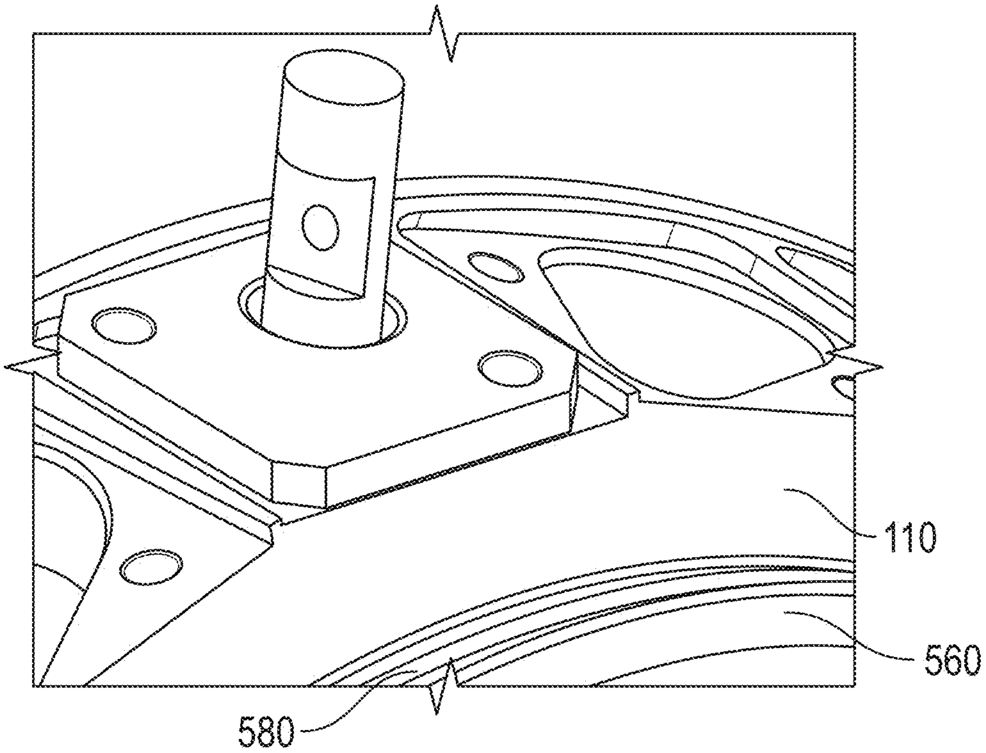
FIG. 22 shows details of a flange with a groove formed on the inlet case, which receives a gasket.

The inlet case 110 and the rotor shroud 100 have mating flanges 560, 570, with the mating flange 560 of the inlet case 110 also shown in FIG. 22. A portion of the mating flange 560 of the inlet case 110 is under or under the mating flange 570 of the rotor shroud 100. A flange groove 580 is formed in the mating flange 560 of the inlet case 110 such that the flange groove 580 faces the mating flange 570 of the rotor shroud 100. A flange packing gasket (or third gasket) 590 is in the flange groove 580. The packing gaskets provide flow and heat seals between the engine core and the flow area outside engine core, e.g., in the engine bypass region. Utilization of the packing grooves increases the operational efficiency of the engine.

Figure 23:
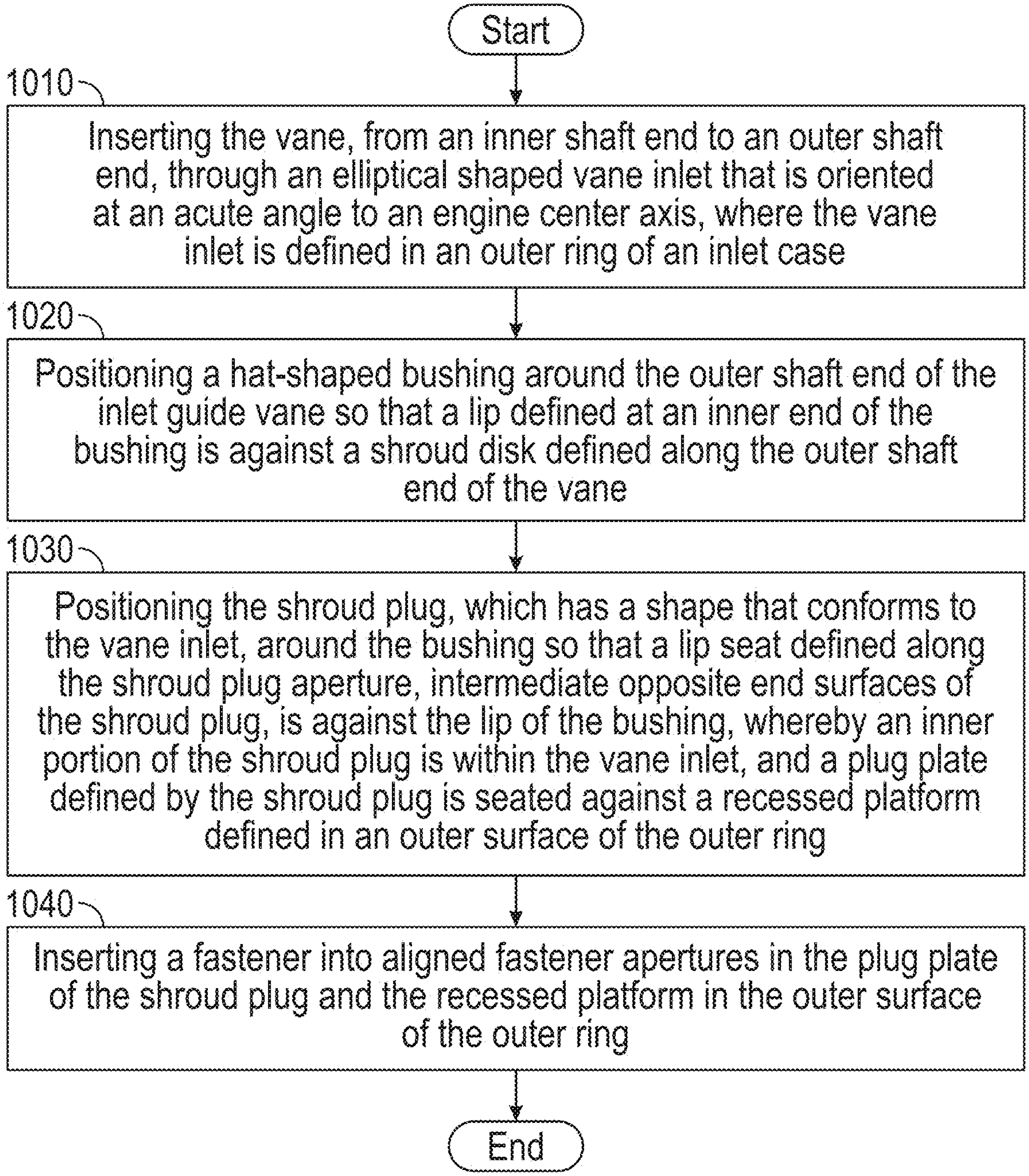
FIG. 23 is a flowchart showing a method of installing an inlet guide vane in the gas turbine engine.

Turning to FIG. 23, a flowchart shows a method of installing an inlet guide vane 140 in the gas turbine engine 20. As shown in block 1010, the method includes inserting the vane 140, from the inner shaft end 170 to the outer shaft end 160, through the elliptical shaped vane inlet 290 that is oriented at an acute angle to an engine center axis A. The vane inlet 290 is defined in the outer ring 240 of the inlet case 110. As shown in block 1020, the method includes positioning the hat-shaped bushing 472 around the outer shaft end 160 of the inlet guide vane 140 so that the lip 476 defined at the inner end 477 of the bushing 472 is against the shroud disk 190 defined along the outer shaft end 160 of the vane 140.

As shown in block 1030, the method includes positioning the shroud plug 330, which has a shape that conforms to the vane inlet 290, around the bushing 472 so that the lip seat formed from the first stepped surface 500 defined along the plug aperture 482, intermediate opposite end surfaces 340, 350 of the shroud plug 330, is against the lip 476 of the bushing 472. From this configuration, the inner portion 360 of the shroud plug 330 is within the vane inlet 290, and the plug plate 357 defined by the shroud plug 330 is seated against the ring recessed platform 400 defined in the outer surface 270 of the outer ring 240. As shown in block 1040, the method includes inserting the fastener 475 into the aligned fastener apertures 470, 480 in the plug plate 357 of the shroud plug 330 and the ring recessed platform 400 in the outer surface 270 of the outer ring 240.

The disclosed embodiments provide a shroud plug for a variable inlet guide vane assembly, where the plug is rotated, e.g., by forty-five degrees, around the engine axis with the addition of a packing groove to seal the shroud plug-aperture interface. The shroud plug aperture is rotated by forty-five degrees around the engine axis. The vane is inserted into the vane inlet and by rotated the vane forty-five degrees from its nominal position. After (or before) the shroud plug is inserted, the vane is rotated back to its nominal position.

The forty-five degrees rotation of both the shroud plug and the vane inlet make the outer ring of the inlet case shorter in the direction of the centerline of the engine. The extra space allows the interface between the inlet case and rotor shroud to be sealed with a packing groove, which prevents air ingestion that would create non-uniform flow. As the shroud plug may be held in place with a single fastener, such as a bolt, the addition of the packing gaskets helps dampen vibrations induced from operation of the vane in the gas path.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An inlet guide vane assembly of a gas turbine engine, the assembly comprising:

an inlet case having an outer ring that extends axially along an engine axis between a ring front end and a ring aft end, and radially between a ring outer surface and a ring inner surface, wherein:

the outer ring has a vane inlet, defined by a vane inlet surface that extends between the ring outer and inner surfaces;

the vane inlet defines a teardrop shape having a round end that is semicircular and a tapered end that tapers to a rounded tip, the vane inlet having an inlet long axis disposed at an acute angle to the engine axis; and the assembly includes a shroud plug, the shroud plug having an inner portion that is disposed within the vane inlet, the inner portion having a shape that conforms with the vane inlet;

wherein:

the shroud plug has a plug outer surface that defines a circumferentially extending plug groove that faces the vane inlet surface; and a packing gasket is disposed in the plug groove.

2. An inlet guide vane assembly of a gas turbine engine, the assembly comprising:

an inlet case having an outer ring that extends axially along an engine axis between a ring front end and a ring aft end, and radially between a ring outer surface and a ring inner surface, wherein: the outer ring has a vane inlet, defined by a vane inlet surface that extends between the ring outer and inner surfaces; the vane inlet defines a teardrop shape having a round end that is semicircular and a tapered end that tapers to a rounded tip, the vane inlet having an inlet long axis disposed at an acute angle to the engine axis; and the assembly includes a shroud plug, the shroud plug having an inner portion that is disposed within the vane inlet, the inner portion having a shape that conforms with the vane inlet, wherein:

the ring outer surface of the outer ring defines a recessed platform that surrounds the vane inlet and defines a square platform shape; and the shroud plug has a plug outer portion defining a plug plate that is seated in the recessed platform and conforms to the square shape of the recessed platform.

3. The assembly of claim 2, wherein:

the inner portion of the shroud plug is teardrop shaped having a plug long axis that extends diagonally across the plug plate of the shroud plug.

4. The assembly of claim 2, wherein:

fastener apertures that are aligned with each other are respectively defined in the recessed platform of the outer ring and the plug plate of the shroud plug; and a fastener extends through the fastener apertures to fix the shroud plug to the outer ring.

5. An inlet guide vane assembly of a gas turbine engine, the assembly comprising:

an inlet case having an outer ring that extends axially along an engine axis between a ring front end and a ring aft end, and radially between a ring outer surface and a ring inner surface, wherein: the outer ring has a vane inlet, defined by a vane inlet surface that extends between the ring outer and inner surfaces; the vane inlet defines a teardrop shape having a round end that is semicircular and a tapered end that tapers to a rounded tip, the vane inlet having an inlet long axis disposed at an acute angle to the engine axis; and the assembly includes a shroud plug, the shroud plug having an inner portion that is disposed within the vane inlet, the inner portion having a shape that conforms with the vane inlet; and a vane extending axially from an outer shaft end to an inner shaft end, wherein the outer shaft end defines a shroud disk and an outer shaft, and a bushing is disposed around the outer shaft end of the vane.

6. The assembly of claim 5, wherein:

the shroud plug has a plug aperture, defined by a plug aperture surface, through which the outer shaft end of the vane and the bushing extends, whereby the plug aperture surrounds the bushing; and the plug aperture conforms to a shape of the bushing.

7. The assembly of claim 5, wherein:

the outer shaft end of the vane defines a vane shaft groove that faces the bushing; and a packing gasket is disposed in the vane shaft groove.

8. A gas turbine engine, comprising:

a core having a hub shaft and a compressor extending axially along an engine axis from an inlet of the compressor to an outlet of the compressor;

a rotor shroud surrounding the core at the compressor;

an inlet case that is forward of the rotor shroud;

an inlet guide vane assembly at the inlet of the compressor, the assembly comprising:

an outer ring, of the inlet case, that extends axially along the engine axis between a ring front end and a ring aft end, and radially between a ring outer surface and a ring inner surface, wherein:

the outer ring has a vane inlet, defined by a vane inlet surface that extends between the ring outer and inner surfaces;

the vane inlet defines a teardrop shape having a round end that is semicircular and a tapered end that tapers to a rounded tip, the vane inlet having an inlet long axis disposed at an acute angle to the engine axis; and the assembly includes a shroud plug, the shroud plug having an inner portion that is disposed within the vane inlet, the inner portion having a shape that conforms with the vane inlet, wherein:

the shroud plug has a plug outer surface that defines a circumferentially extending plug groove that faces the vane inlet surface; and a packing gasket is disposed in the plug groove.

9. The engine of claim 8, wherein:

the inlet case and the rotor shroud each have a mating flange, wherein a flange groove is formed in the mating flange of the inlet case that faces the mating flange of the rotor shroud; and a packing gasket is disposed in the flange groove.

10. A gas turbine engine, comprising:

a core having a hub shaft and a compressor extending axially along an engine axis from an inlet of the compressor to an outlet of the compressor; a rotor shroud surrounding the core at the compressor; an inlet case that is forward of the rotor shroud; an inlet guide vane assembly at the inlet of the compressor, the assembly comprising: an outer ring, of the inlet case, that extends axially along the engine axis between a ring front end and a ring aft end, and radially between a ring outer surface and a ring inner surface, wherein: the outer ring has a vane inlet, defined by a vane inlet surface that extends between the ring outer and inner surfaces; the vane inlet defines a teardrop shape having a round end that is semicircular and a tapered end that tapers to a rounded tip, the vane inlet having an inlet long axis disposed at an acute angle to the engine axis; and the assembly includes a shroud plug, the shroud plug having an inner portion that is disposed within the vane inlet, the inner portion having a shape that conforms with the vane inlet, wherein:

the ring outer surface of the outer ring defines a recessed platform that surrounds the vane inlet, wherein the recessed platform defines a square shape; and the shroud plug has a plug outer portion defining a plug plate that is seated in the recessed platform and conforms to the square shape of the recessed platform.

11. The engine of claim 10, wherein:

the inner portion of the shroud plug is teardrop shaped having a plug long axis that extends diagonally across the plug plate of the shroud plug.

12. The engine of claim 10, wherein:

fastener apertures that are aligned with each other are respectively defined in the recessed platform of the outer ring and the plug plate of the shroud plug; and a fastener extends through the fastener apertures to fix the shroud plug to the outer ring.

13. A gas turbine engine, comprising:

a core having a hub shaft and a compressor extending axially along an engine axis from an inlet of the compressor to an outlet of the compressor; a rotor shroud surrounding the core at the compressor; an inlet case that is forward of the rotor shroud; an inlet guide vane assembly at the inlet of the compressor, the assembly comprising: an outer ring, of the inlet case, that extends axially along the engine axis between a ring front end and a ring aft end, and radially between a ring outer surface and a ring inner surface, wherein: the outer ring has a vane inlet, defined by a vane inlet surface that extends between the ring outer and inner surfaces; the vane inlet defines a teardrop shape having a round end that is semicircular and a tapered end that tapers to a rounded tip, the vane inlet having an inlet long axis disposed at an acute angle to the engine axis; and the assembly includes a shroud plug, the shroud plug having an inner portion that is disposed within the vane inlet, the inner portion having a shape that conforms with the vane inlet; and a vane extending axially from an outer shaft end to an inner shaft end, wherein the outer shaft end defines a shroud disk and an outer shaft, and a bushing is disposed around the outer shaft end of the vane.

14. The engine of claim 13, wherein:

the shroud plug has a plug aperture, defined by a plug aperture surface, through which the outer shaft end of the vane and the bushing extends, whereby the plug aperture surrounds the bushing; and the plug aperture conforms to a shape of the bushing.

15. The engine of claim 13, wherein:

the outer shaft end of the vane defines a vane shaft groove that faces the bushing; and a packing gasket is disposed in the vane shaft groove.

* * * * *